(12) United States Patent
Kum et al.

(10) Patent No.: US 12,576,850 B2
(45) Date of Patent: Mar. 17, 2026

(54) LANE CHANGE SYSTEM OF AUTONOMOUS VEHICLE

(71) Applicant: Korea Advanced Institute of Science and Technology, Daejeon (KR)

(72) Inventors: Dongsuk Kum, Daejeon (KR); Kibeom Lee, Daejeon (KR); Seul Bin Hwang, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 366 days.

(21) Appl. No.: 17/947,800

(22) Filed: Sep. 19, 2022

(65) Prior Publication Data

US 2023/0139133 A1 May 4, 2023

(30) Foreign Application Priority Data

Nov. 4, 2021 (KR) ........................ 10-2021-0150288
Feb. 14, 2022 (KR) ........................ 10-2022-0018946

(51) Int. Cl.
*B60W 30/18* (2012.01)
*B60W 50/00* (2006.01)
*B60W 60/00* (2020.01)

(52) U.S. Cl.
CPC .. *B60W 30/18163* (2013.01); *B60W 50/0097* (2013.01); *B60W 60/0015* (2020.02);
(Continued)

(58) Field of Classification Search
CPC ....... B60W 30/18163; B60W 60/0015; B60W 2554/80; B60W 2554/4045;
(Continued)

(56) References Cited

U.S. PATENT DOCUMENTS

| | | | | |
|---|---|---|---|---|
| 9,475,491 B1 * | 10/2016 | Nagasaka | ............. | B60W 30/16 |
| 2013/0226432 A1 * | 8/2013 | Tsuruta | ................. | B60W 30/16 |
| | | | | 701/96 |

(Continued)

FOREIGN PATENT DOCUMENTS

| | | |
|---|---|---|
| JP | 2021046193 | 3/2021 |
| KR | 1020180050779 | 5/2018 |

(Continued)

OTHER PUBLICATIONS

Lygeros et al., "An Interface Between Continuous and Discrete-Event Controllers for Vehicle Automation", Feb. 1997, URL: <https://ieeexplore.ieee.org/document/554756?source=IQplus> (Year: 2002).*

(Continued)

*Primary Examiner* — Jason Holloway
*Assistant Examiner* — Benjamin J Brosh
(74) *Attorney, Agent, or Firm* — Hamilton, Brook, Smith & Reynolds, P.C.

(57) ABSTRACT

Disclosed is a lane change system for an autonomous vehicle. A lane change method performed by a lane change system may include receiving driving state information of a vehicle and outputting a path and velocity plan corresponding to the input driving state information of the vehicle by using a lane change algorithm. The driving state information of the vehicle may include state information of the vehicle including driving information of the vehicle and situation information for recognizing a situation of a surrounding vehicle on the basis of the vehicle.

4 Claims, 8 Drawing Sheets

(52) U.S. Cl.
CPC ................. *B60W 60/00274* (2020.02); *B60W 2554/4045* (2020.02); *B60W 2554/80* (2020.02); *B60W 2554/802* (2020.02)

(58) Field of Classification Search
CPC ..... B60W 2554/802; B60W 2554/804; B60W 2520/10; B60W 50/0097; B60W 60/00274; B60W 60/00276
See application file for complete search history.

(56)               References Cited

U.S. PATENT DOCUMENTS

| | | | | |
|---|---|---|---|---|
| 2016/0297447 | A1* | 10/2016 | Suzuki | B60W 30/16 |
| 2017/0120912 | A1* | 5/2017 | Ishioka | B60W 30/16 |
| 2017/0242435 | A1* | 8/2017 | Nilsson | G08G 1/167 |
| 2018/0170388 | A1* | 6/2018 | Shin | B60W 60/001 |
| 2019/0329778 | A1* | 10/2019 | D'sa | G06V 20/56 |
| 2019/0391582 | A1* | 12/2019 | Jung | B60Q 1/525 |
| 2020/0070659 | A1* | 3/2020 | Okada | B60W 40/04 |
| 2020/0139973 | A1* | 5/2020 | Palanisamy | G06N 3/084 |
| 2020/0180636 | A1* | 6/2020 | Oh | B60W 30/09 |
| 2020/0189596 | A1* | 6/2020 | Kang | B60W 60/0011 |
| 2020/0307598 | A1* | 10/2020 | Kumano | B60W 30/162 |
| 2020/0307599 | A1* | 10/2020 | Oka | B60W 60/00276 |
| 2021/0001858 | A1* | 1/2021 | Kang | G06N 3/044 |
| 2021/0039649 | A1* | 2/2021 | Yu | G06V 20/58 |
| 2021/0061282 | A1* | 3/2021 | Jafari Tafti | G05D 1/0088 |
| 2021/0107487 | A1* | 4/2021 | Oh | B60W 30/09 |
| 2021/0108936 | A1* | 4/2021 | Seegmiller | B60W 60/0011 |
| 2021/0179092 | A1 | 6/2021 | Chen et al. | |
| 2021/0188275 | A1* | 6/2021 | Matsumura | B60W 60/0053 |
| 2021/0197858 | A1* | 7/2021 | Zhang | G08G 1/161 |
| 2021/0237776 | A1* | 8/2021 | Hashimoto | B60W 40/09 |
| 2021/0295703 | A1* | 9/2021 | Jalali | G08G 1/096741 |
| 2021/0300412 | A1* | 9/2021 | Dingli | B60W 50/0098 |
| 2022/0048513 | A1* | 2/2022 | Xu | B60W 30/18163 |
| 2022/0075374 | A1* | 3/2022 | Hashimoto | B60W 50/14 |
| 2022/0135039 | A1* | 5/2022 | Jardine | B60W 30/18159 701/26 |
| 2023/0009173 | A1* | 1/2023 | Reshef | B60W 30/18163 |

FOREIGN PATENT DOCUMENTS

| | | |
|---|---|---|
| KR | 1020180070384 | 6/2018 |
| KR | 1020190104474 | 9/2019 |
| KR | 1020210003329 | 1/2021 |

OTHER PUBLICATIONS

Kim et al., "Intention Aware Motion Planning with Model Predictive Control in Highway Merge Scenario", Mar. 2019, Provided By Applicant on IDS dated Mar. 27, 2023 (Year: 2019).*
Lygeros et al., "An Interface Between Continuous and Discrete-Event Controllers for Vehicle Automation", Feb. 1997, URL: <https://ieeexplore.ieee.org/document/554756?source=IQplus>, Provided By Examiner in Previous Office Action (Year: 2002).*
International Search Report issued on Nov. 4, 2021 for PCT Application No. PCT/KR2022/011370.
European Search Report issued on Feb. 21, 2023 for Application No. EP 22196698.9.
Kim , Hayoung et al: "Intention Aware Motion Planning with Model Predictive Control in Highway Merge Scenario", SAE 2010 Commercial Vehicle Engineering Congress SAE Technical Papers, vol. 1, Mar. 25, 2019 (Mar. 25, 2019), pp. 1-7, XP093022782, US ISSN: 0148-7191, DOI: 10.4271/2019-01-1402.
Hart, Patrick et al: "Lane-Merging Using Policy-based Reinforcement Learning and Post-Optimization", 2019 IEEE Intelligent Transportation Systems Conference (ITSC), IEEE, Oct. 27, 2019 (Oct. 27, 2019), pp. 3176-3181, XP033668326, DOI: 10.1109/ITSC.2019.8917002 [retrieved on Nov. 27, 2019].
Hwang, Seulbin et al: "Autonomous Vehicle Cut-In Algorithm for Lane-Merging Scenarios via Policy-Based Reinforcement Learning Nested Within Finite—State Machine", IEEE Transactions on Intelligent Transportation Systems, IEEE, Piscataway, NJ, USA, vol. 23, No. 10, Oct. 1, 2022 (Oct. 1, 2022), pp. 17594-17606, XP011922729, ISSN: 1524-9050, DOI: 10.1109/TITS.2022.3153848 [retrieved on Mar. 8, 2022].

* cited by examiner

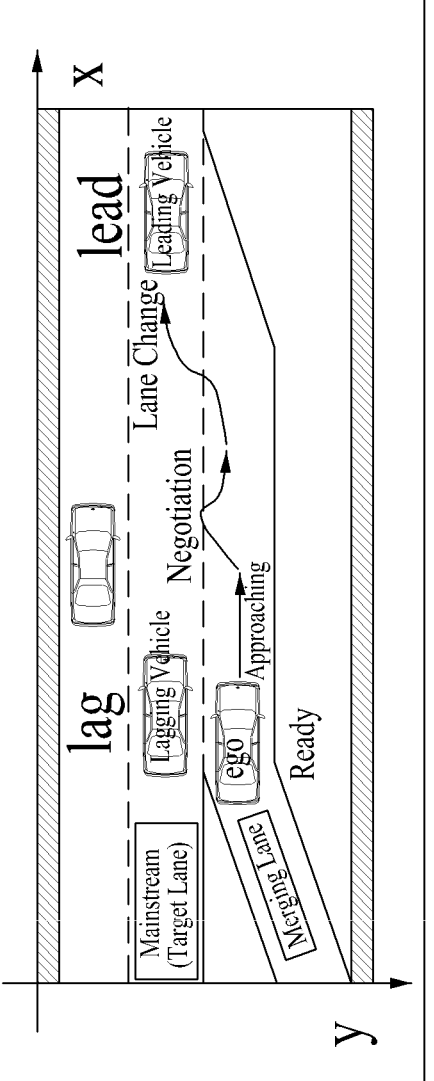

Algorithm Gap risk Evaluation

1. If cut-in command
   1. While not transition indicator == 'finish'
      1. Gap Risk Evaluation within prediction time horizon
         1. While Phase == 'Ready':
            1. Select target gap among all gaps
         2. While Phase == 'Approach' or 'negotiation':
            1. Check whether target gap vehicles lane changes
                1. Update target gap
            2. Check whether the other vehicle lane changes between target gap vehicle
                1. transition indicator == 'ready'

FIG. 7

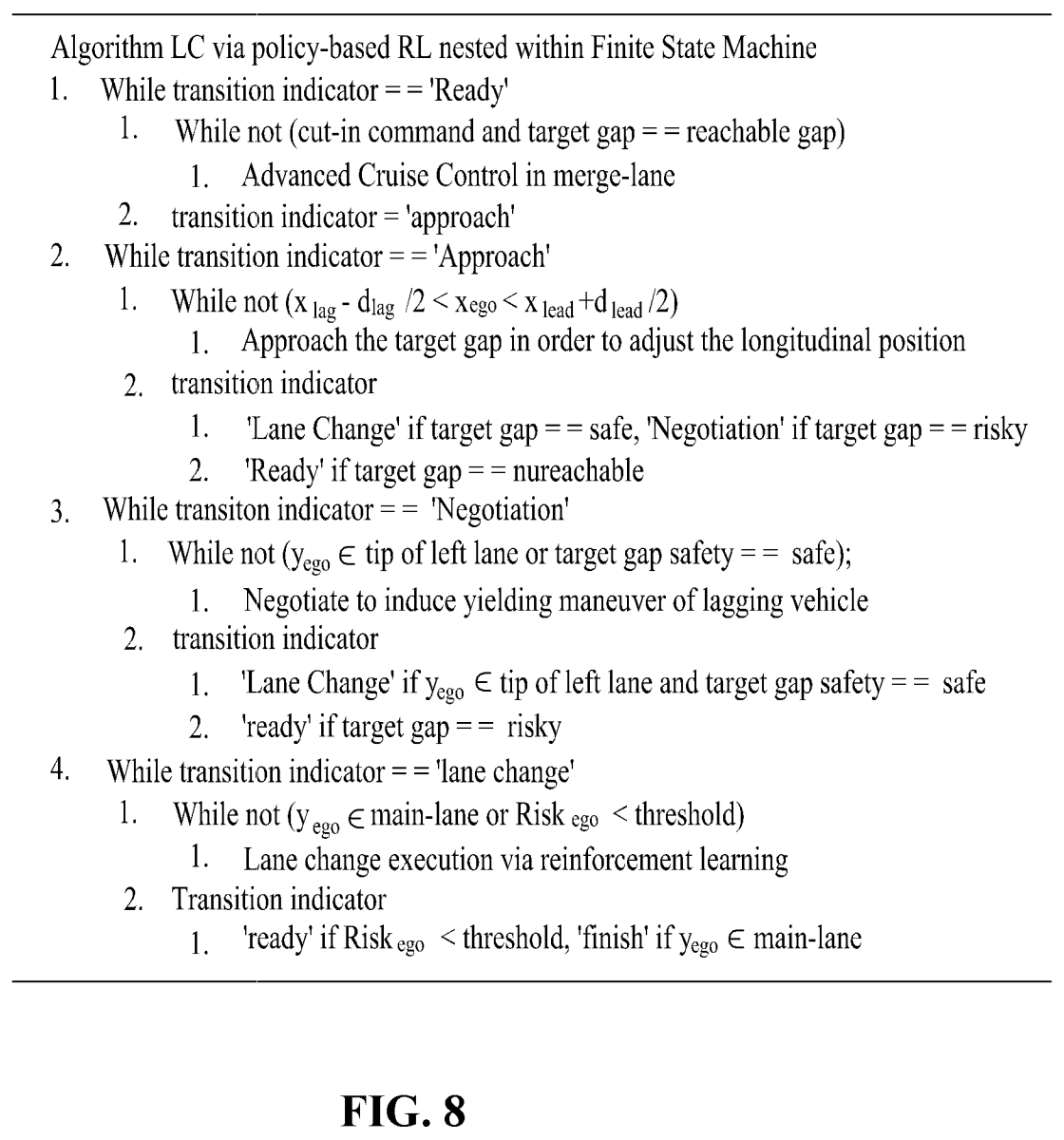

Algorithm LC via policy-based RL nested within Finite State Machine

1. While transition indicator == 'Ready'
   1. While not (cut-in command and target gap == reachable gap)
      1. Advanced Cruise Control in merge-lane
   2. transition indicator = 'approach'
2. While transition indicator == 'Approach'
   1. While not $(x_{lag} - d_{lag}/2 < x_{ego} < x_{lead} + d_{lead}/2)$
      1. Approach the target gap in order to adjust the longitudinal position
   2. transition indicator
      1. 'Lane Change' if target gap == safe, 'Negotiation' if target gap == risky
      2. 'Ready' if target gap == nureachable
3. While transition indicator == 'Negotiation'
   1. While not $(y_{ego} \in$ tip of left lane or target gap safety == safe);
      1. Negotiate to induce yielding maneuver of lagging vehicle
   2. transition indicator
      1. 'Lane Change' if $y_{ego} \in$ tip of left lane and target gap safety == safe
      2. 'ready' if target gap == risky
4. While transition indicator == 'lane change'
   1. While not $(y_{ego} \in$ main-lane or $Risk_{ego} <$ threshold)
      1. Lane change execution via reinforcement learning
   2. Transition indicator
      1. 'ready' if $Risk_{ego} <$ threshold, 'finish' if $y_{ego} \in$ main-lane

FIG. 8

LANE CHANGE SYSTEM OF AUTONOMOUS VEHICLE

CROSS-REFERENCES TO RELATED APPLICATIONS

This application is based on and claims priority under 35 U.S.C. 119 to Korean Patent Application No. 10-2021-0150288, filed on Nov. 4, 2021, 10-2022-0018946, filed on Feb. 14, 2022 in the Korean intellectual property office, the disclosures of which are herein incorporated by reference in their entireties.

TECHNICAL FIELD

The following description relates to a technology for changing a lane of a vehicle.

BACKGROUND OF THE DISCLOSURE

As the needs of a user for a vehicle are increased, various systems for improving the safety and convenience of a driver are developed. In particular, in the global vehicle industry, an autonomous driving technology is actively developed according to a commercialization plan for autonomous driving. Accordingly, it is expected that the importance of a surrounding vehicle prediction technology corresponding to a core technology of an autonomous vehicle is increased.

However, a case where an autonomous vehicle does not perform a lane change in which the conflicting interests of surrounding vehicles are maximized or an accident occurs when the autonomous vehicle performs the lane change frequently occurs. The existing lane change technologies do not flexibly handle a collision situation and do not consistently avoid an accident. Furthermore, the existing lane change technologies show a sensitive tradeoff relation in which lane change performance is low if the safety of a vehicle is secured or the level of safety is low if a lane change is positively performed.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Embodiments may provide a lane change method and system for an autonomous vehicle, which guarantee the safety of a vehicle while guaranteeing lane change performance of the vehicle by dividing the state in which a lane is changed into a plurality of lane change transition conditions.

Embodiments may provide a method and system for a lane change into an optimal gap that is selected by calculating the easiness and danger of each lane change by using a gap search and evaluation algorithm for a lane change.

In an embodiment, a lane change method performed by a lane change system may include receiving driving state information of a vehicle and outputting a path and velocity plan corresponding to the input driving state information of the vehicle by using a lane change algorithm. The driving state information of the vehicle may include state information of the vehicle including driving information of the vehicle and situation information for recognizing a situation of a surrounding vehicle on the basis of the vehicle.

Outputting the path and velocity plan may include searching for a gap into which the vehicle changes its lane and controlling the vehicle to change the lane based on a plurality of lane change transition conditions set to change a lane in the retrieved gap.

Searching for the gap may include searching for the gap into which the vehicle changes the lane by predicting a future movement of the surrounding vehicle based on a gap search and evaluation algorithm.

Searching for the gap may include analyzing easiness of the lane change between the vehicle and the surrounding vehicle and evaluating a level of safety between the vehicle and the surrounding vehicle. The analysis of the easiness of the lane change is for determining whether the retrieved gap is a gap between the vehicle and the surrounding vehicle, which is reachable by the vehicle for a minimum time or more that is taken to perform the lane change on the basis of a longitudinal position of the vehicle. The level of safety is for determining whether the gap between the vehicle and the surrounding vehicle has a minimum safety distance.

The plurality of lane change transition conditions may include a ready stage, an approaching stage, a lane change stage, and a completion stage for the lane change by the vehicle.

Searching for the gap may include searching for the gap for the lane change between the vehicle and the surrounding vehicle while maintaining a safety distance from a leading vehicle on the basis of the vehicle while the vehicle is driving or the driving of the vehicle is stopped in the ready stage.

Controlling the vehicle may include transitioning from the ready stage to the approaching stage in order to adjust the longitudinal position for the retrieved gap, and bringing the vehicle to approach the retrieved gap in the transitioned approaching stage.

Controlling the vehicle may include determining whether the retrieved gap is a gap reachable by the vehicle for a minimum time or more that is taken to perform the lane change while the vehicle approaches the retrieved gap.

Controlling the vehicle may include transitioning from the approaching stage to the ready stage when the retrieved gap is determined as a gap unreachable by the vehicle for the minimum time or more that is taken to perform the lane change.

Controlling the vehicle may include transitioning from the approaching stage to a negotiation stage so that the vehicles cuts in the retrieved gap as the vehicle approaches the retrieved gap, securing an area of the retrieved gap by delivering a lane change intention of the vehicle to a lagging vehicle in the retrieved gap in the transitioned negotiation stage, and identifying a yield intention of the lagging vehicle.

Controlling the vehicle may include transitioning from the negotiation stage to the lane change stage when a minimum safety distance is secured in the retrieved gap, and transitioning from the negotiation stage to the ready stage when a minimum safety distance is not secured in the retrieved gap.

Controlling the vehicle may include transitioning from the negotiation stage to the lane change stage when the yield intention of the lagging vehicle is identified, and performing, by the vehicle, the lane change in the transitioned lane change stage.

Controlling the vehicle may include performing, by the vehicle, the lane change by using a deep reinforcement learning algorithm in the transitioned lane change stage. The deep reinforcement learning algorithm generates a lane change path for the vehicle by determining an interaction between the vehicle and the surrounding vehicle, a form of a road, and a limitation condition in which a lane needs to be changed.

Controlling the vehicle may include calculating a degree of risk for the surrounding vehicle in real time while the vehicle performs the lane change in the lane change stage, and transitioning from the lane change stage to the ready stage when the calculated degree of risk is a specific degree of risk or more.

Controlling the vehicle may include transitioning from the lane change stage to the completion stage as the vehicle performs the lane change, and maintain a lane of the vehicle by considering an inter-vehicle distance from a leading vehicle in a target lane when the vehicle succeeds in the target lane in the retrieved gap in the transitioned completion stage.

In an embodiment, a lane change system may include a driving state input unit configured to receive driving state information of a vehicle, and a path and velocity plan output unit configured to output a path and velocity plan corresponding to the input driving state information of the vehicle by using a lane change algorithm. The driving state information of the vehicle may include state information of the vehicle including driving information of the vehicle and situation information for recognizing a situation of a surrounding vehicle on the basis of the vehicle.

A safe and consistent lane change can be performed because the lane change is performed by dividing the lane change into several stages based on a finite state machine and setting a transition criterion suitable for characteristics for each step.

Furthermore, an optimal lane change strategy suitable for a driver's propensity can be derived by adjusting a transition criterion.

Moreover, a lane change success rate can be maximized without sacrificing the safety of a vehicle because a deep reinforcement learning-based methodology is used when the vehicle performs a lane change. Accordingly, the commercialization of an autonomous vehicle can be advanced by securing lane change performance of the vehicle in an essential lane change section, such as a merge section, in addition to a non-essential lane change case such as passing.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein:

FIG. 7 is a diagram for describing a transition condition between stages, which is set for a lane change in an embodiment.

FIG. 8 is a diagram illustrating a pseudo code of a lane change algorithm including transition conditions set for a lane change in an embodiment.

DETAILED DESCRIPTION

While illustrative embodiments have been illustrated and described, it will be appreciated that various changes can be made therein without departing from the spirit and scope of the disclosure.

Hereinafter, embodiments are described in detail with reference to the accompanying drawings.

In an embodiment, an operation for deriving safe and consistent lane change performance of a vehicle by determining a driving step of the vehicle through the evaluation of a degree of gap risk between vehicles in real time based on the finite state machine is described. A lane change propensity can be adjusted by adjusting a transition condition of the finite state machine.

Furthermore, a high lane change success rate can be achieved without sacrificing the safety of a vehicle through sufficient experiences in a complicated situation because an interaction with a surrounding vehicle is maximized by applying a deep reinforcement learning algorithm in a lane change stage.

Furthermore, the present disclosure may be used in various scenarios for a lane change, such as a lane merge section and a modern roundabout, in addition to a lane change for passing. In particular, the present disclosure is effective in an essential lane change situation, such as the lane merge section in which a lane change limitation distance is present, in that a lane change success rate is not sacrificed while guaranteeing the safety of a vehicle.

Figure 1:
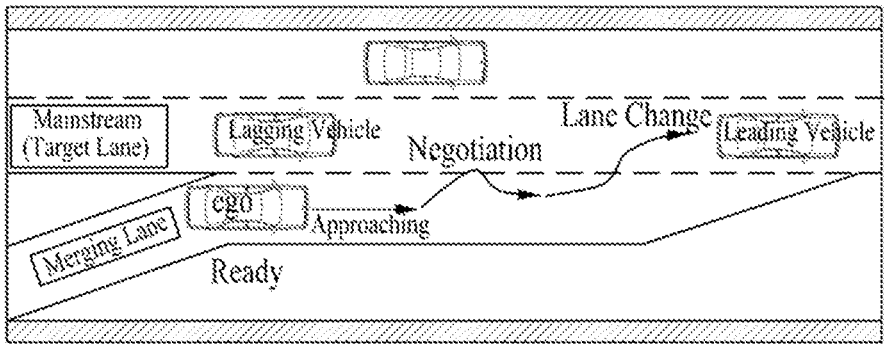
FIG. 1 is a diagram illustrating a position and movement of a vehicle in each step when the vehicle performs a lane change in an embodiment.

FIG. 1 is a diagram illustrating a position and movement of a vehicle in each step when the vehicle performs a lane change in an embodiment.

A lane change system can guarantee the safety of a vehicle while guaranteeing lane change performance of the vehicle by dividing the state in which the vehicle performs a lane change into several stages. The lane change system may output a path and velocity plan for lane change corresponding to driving state information of the vehicle using a lane change algorithm. In this case, the path and velocity plan may include path information of the vehicle and velocity information of the vehicle for changing a lane. The lane change system may output a path and a velocity of the vehicle for lane change based on the output path and velocity plan. The lane change system may perform a lane change into an optimal gap that is selected by analyzing the easiness of the lane change and calculating a degree of gap risk of each gap by using a gap search and evaluation algorithm for the lane change prior to the lane change. Furthermore, the lane change system can significantly improve the safety and lane change performance of a vehicle when a vehicle performs a lane change, such as that stopping the lane change and setting another gap, when the degree of risk exceeds a criterion by determining the degree of risk for an optimal gap that is selected in real time while the vehicle performs the lane change. Accordingly, the lane change system can reduce an accident that consistently occurs when the existing vehicle (autonomous vehicle) performs a lane change, and can improve lane change performance.

In order to simultaneously guarantee lane change performance and stability of a vehicle, the finite state machine that determines a lane change transition condition that needs to be now selected by the vehicle may be designed. In this case, the lane change transition condition may mean a driving step that needs to be now selected by the vehicle, and may include a ready stage, an approaching stage, a negotiation stage, a lane change stage, and a completion stage.

In this case, the vehicle may correspond to a passenger car (e.g., a sedan or a SUV), a truck, or a bus, and may be driven by a motor or may be driven by electricity or hydrogen not the motor. Furthermore, the vehicle may mean an autonomous vehicle that autonomously drives although a driver does not manipulate the vehicle. As described above, the lane change system may operate in the vehicle. In an embodiment, an autonomous vehicle is described as an example in order to describe a lane change operation of the vehicle.

Figure 4:
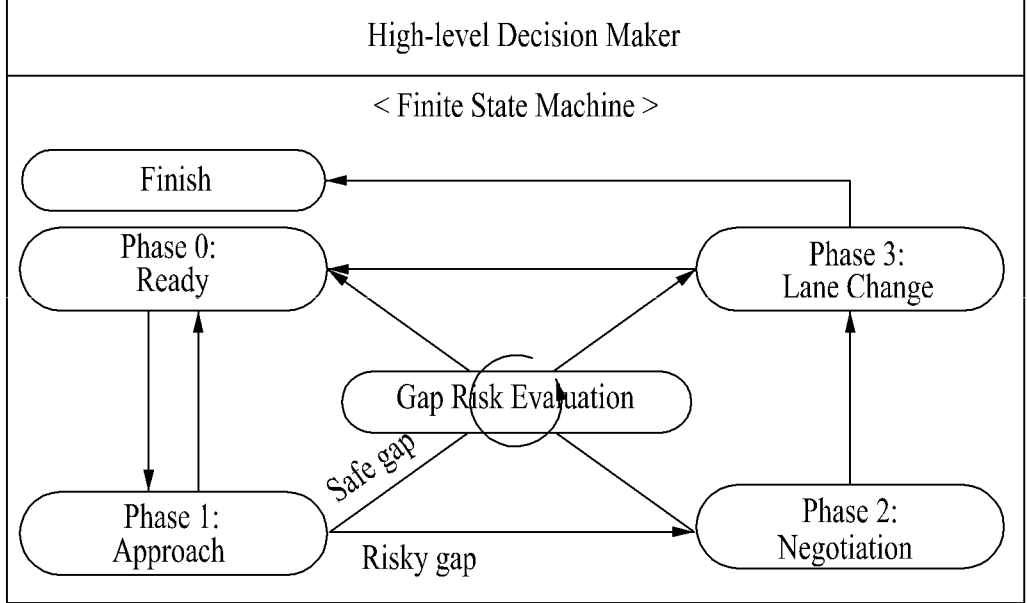
FIG. 4 is a diagram illustrating a finite state machine for a lane change in an embodiment.

Reference is made to the finite state machine in FIG. 4 for describing the lane change transition condition. Accordingly, the ready stage, the approaching stage, the negotiation stage, the lane change stage, and the completion stage are described.

In the ready stage, a vehicle (an ego vehicle) drives while maintaining a safety distance from a leading vehicle in a lane in which the vehicle is placed, and simultaneously searches for an optimal gap between the vehicle and a surrounding vehicle for a lane change. In order to search for an optimal gap, the easiness of the lane change may be analyzed, and an optimal gap in which a degree of gap risk is secured may be derived by evaluating a level of safety and approach between all vehicles, which may be sensed, as in FIG. 4. In this case, the analysis of the easiness of the lane change and the safety may be derived by the gap search and evaluation algorithm.

Figure 5:
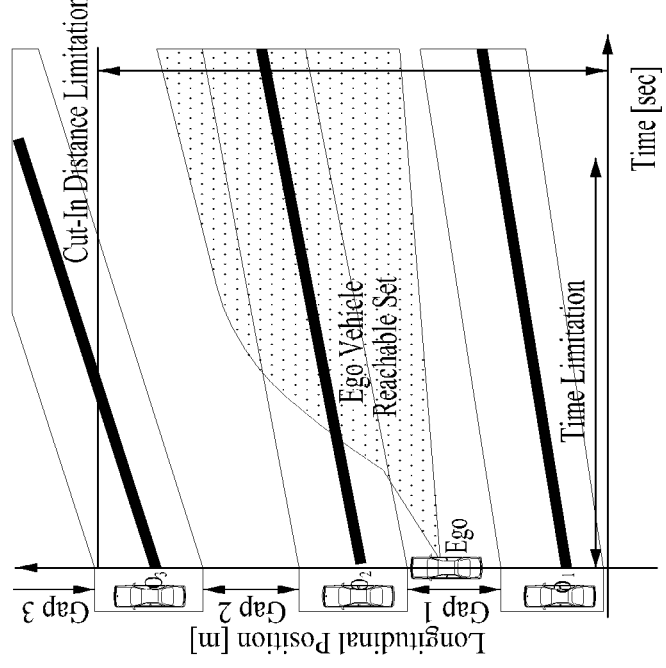
FIG. 5 is a diagram for describing a gap search and evaluation algorithm for a lane change in an embodiment.
Figure 5:
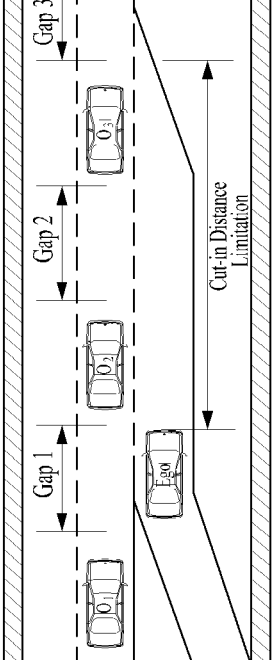

FIG. 5 is a diagram for describing the gap search and evaluation algorithm for a lane change. The gap search and evaluation algorithm analyzes the easiness of a lane change and evaluates a degree of gap risk based on an algorithm for predicting a future movement of a surrounding vehicle. A minimum safety distance between a lagging vehicle and a leading vehicle in each gap may be taken into consideration like a gray area. The minimum safety distance is a minimum distance for avoiding an unexpected accident, and may be calculated as the sum of a free running distance and a stop distance. Furthermore, an area (blue area) that may be physically reached by a vehicle for a predicted time may be calculated.

The analysis of the easiness of a lane change is for determining whether a gap for a lane change is a gap between vehicles, which is reachable by a vehicle for a minimum time or more that is taken to perform the lane change on the basis of a longitudinal position of the vehicle. The degree of gap risk is for determining whether a gap between a vehicle and a surrounding vehicle has a minimum safety distance. The safety of a vehicle may be evaluated based on the determined degree of gap risk. An optimal gap that satisfies both the easiness of a lane change and the safety may be set as a target gap.

In the approaching stage, the vehicle may approach a retrieved gap in order to adjust the longitudinal position with the gap retrieved in the ready stage. An approach algorithm may derive approaching acceleration based on a relative distance and speed between the leading vehicle and the lagging vehicle in the retrieved gap.

In the negotiation stage, the vehicle widens a gap area to be cut in and checks a yield intention of the lagging vehicle by showing an intention of the lane change to the lagging vehicle in the retrieved gap. Whether a lane change is successful and the level of safety are greatly influenced by the yield intention of the lagging vehicle in the target gap. Accordingly, the vehicle can increase the safety of the lane change by driving very close to a next lane and previously checking the yield intention of the lagging vehicle prior to the lane change. Furthermore, an effect in that a lane change target gap can be increased in the state in which the safety of the vehicle has been guaranteed may be expected.

Figure 6:
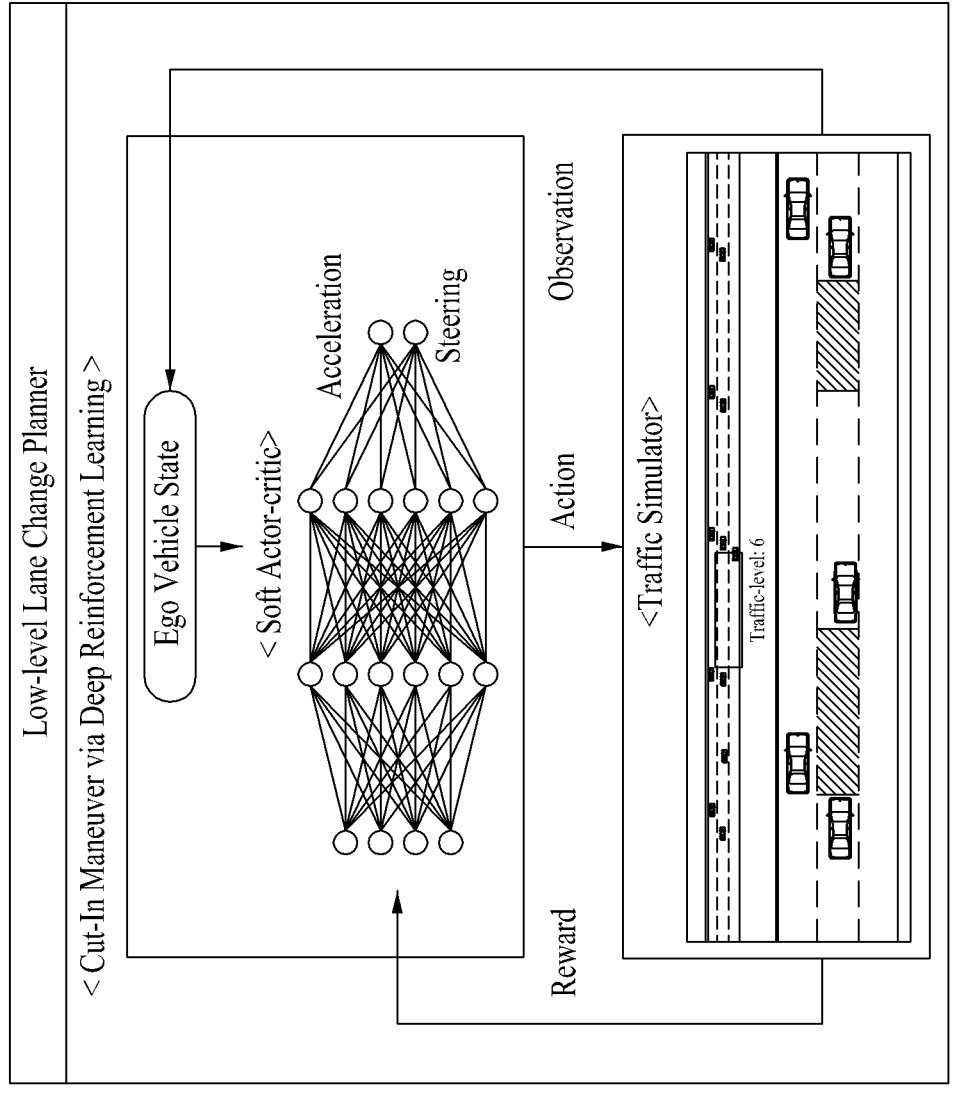
FIG. 6 is a diagram for describing a deep reinforcement learning algorithm in a lane change stage according to an embodiment.

In the lane change stage, the vehicle performs the lane change by using the deep reinforcement learning algorithm not having a model. FIG. 6 is a diagram for describing the deep reinforcement learning algorithm in the lane change stage. The prediction of movements of a vehicle and surrounding vehicles becomes difficult because an interaction between the vehicle and the surrounding vehicles having various driving propensities is maximized when a lane change is performed. The deep reinforcement learning algorithm not having a model may derive an optimal lane change execution ability suitable for each situation through sufficient repetition training in a simulator in which various lane change situations have been implemented.

In the lane change stage using the deep reinforcement learning algorithm, a lane change path for the vehicle may be generated by complexly determining various conditions, such as a form of a road or a limitation condition (e.g., the end of a merge road) in which a lane has to be changed, in addition to an interaction with surrounding vehicles.

In the completion stage, after the vehicle successfully enters a lane into which the lane of the vehicle is to be changed, the vehicle maintains the lane by considering an inter-vehicle distance with the leading vehicle in the entered lane.

FIG. 7 is a diagram for describing a transition condition between stages, which is set for a lane change in an embodiment.

The lane change system may control a vehicle to change a lane on which the vehicle is driving based on a plurality of lane change transition conditions that are set for a lane change in a retrieved gap. The lane change system may search for a gap between the vehicle and a surrounding vehicle in the ready stage of the vehicle. The lane change system may transition to the approaching stage or the negotiation stage when searching for the gap in the ready stage. The lane change system may identify whether the vehicle has performed the lane change into the retrieved gap (or a target gap). In this case, when the lane change is performed, the lane change system may update the retrieved gap. Furthermore, the lane change system may identify whether another vehicle performs a lane change between the vehicle and the surrounding vehicle in the retrieved gap. In this case, when the another vehicle performs the lane change, the lane change system may transition to the ready stage.

FIG. 8 is a diagram illustrating a pseudo code of a lane change algorithm including transition conditions set for a lane change in an embodiment.

For a transition from the ready stage to the approaching stage, in order to search for a gap for a lane change, the gap reachable by a vehicle for a minimum time or more that is taken to perform the lane change needs to be derived through the gap search and evaluation algorithm. In this case, if a plurality of gaps is searched for, one target gap into which a lane is to be changed may be set. If one gap is searched for, the retrieved gap may become a target gap.

In the approaching stage, while approaching the target gap, the vehicle may perform an algorithm for simultaneously evaluating the easiness of a lane change into the target gap and the level of safety for the lane change. If the target gap is determined as a gap unreachable by the vehicle for the minimum time or more that is taken to perform the lane change while the vehicle approaches the target gap, the vehicle may transition from the approaching stage to the ready stage again. Alternatively, if the target gap is determined as a gap reachable by the vehicle for the minimum time or more that is taken to perform the lane change, as the approach to the lagging vehicle placed in the target gap is completed, the vehicle may transition from the approaching stage to the negotiation stage or the lane change stage. If it is determined that a minimum safety distance has been secured in the target gap through the gap search and evaluation algorithm for the lane change, the vehicle may transition from the approaching stage to the lane change stage. If it is determined that the minimum safety distance has not been secured in the target gap, the vehicle may transition from the approaching stage to the negotiation stage.

In the negotiation stage, the vehicle may deliver a lane change intention of the vehicle to the lagging vehicle in the target gap while driving closely to the target gap as much as possible to the extent that the vehicle does not pass the lane of the target gap. In the negotiation process, if the minimum safety distance is secured in the target gap, the vehicle may transition from the negotiation stage to the lane change stage. If the minimum safety distance is not secured in the target gap, the vehicle may transition from the negotiation stage to the ready stage.

In the lane change stage, the vehicle may perform the lane change and simultaneously calculate a degree of risk for surrounding vehicles in real time. When a risk degree result calculated from the degree of risk is a specific degree of risk or more, the vehicle may transition from the lane change stage to the ready stage. When the risk degree result is the specific degree of risk or less and the vehicle enters the lane of the target gap, the vehicle may transition from the lane change stage to the completion stage.

Figure 2:
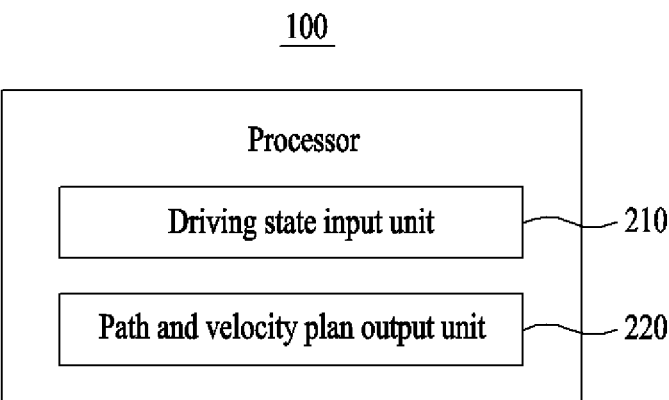
FIG. 2 is a block diagram for describing a construction of a lane change system in an embodiment.
Figure 3:
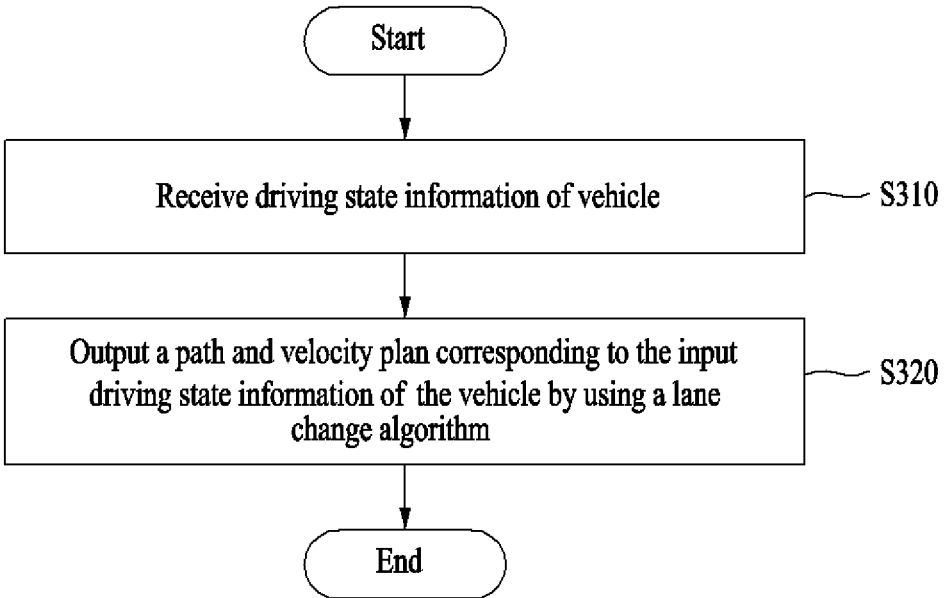
FIG. 3 is a flowchart for describing a lane change method of the lane change system according to an embodiment.

FIG. 2 is a block diagram for describing a construction of a lane change system in an embodiment. FIG. 3 is a flowchart for describing a lane change method of the lane change system according to an embodiment.

The processor of the lane change system 100 may include a driving state input unit 210 and a path and velocity plan output unit 220. The components of the processor may be expressions of different functions that are performed by the processor based on a control command that is provided by a program code stored in the lane change system 100. The processor and the components of the processor may control the lane change system 100 to perform steps 310 to 320 that are included in the lane change method of FIG. 3. In this case, the processor and the components of the processor may be implemented to execute an instruction according to a code of an operating system and a code of at least one program that are stored in a memory.

The processor may load, onto the memory, a program code stored in a file of a program for the lane change method. For example, when the program is executed by the lane change system 100, the processor may control the lane change system 100 to load the program code from the file of the program to the memory under the control of the operating system. In this case, the driving state input unit 210 and the path and velocity plan output unit 220 may be different functional expressions of the processor for subsequently executing steps 310 to 320 by executing an instruction of a corresponding part, which is included in the program code loaded onto the memory.

In step 310, the driving state input unit 210 may receive driving state information of a vehicle. In this case, the driving state information of the vehicle may include situation information of a surrounding vehicle for recognizing a situation of the surrounding vehicle that is present on the basis of the vehicle, in addition to driving information indicating whether the driving of the vehicle has been stopped or whether the vehicle is driving and state information (e.g., information on the position of the vehicle and information on the speed of the vehicle) related to the driving of the vehicle. For example, the situation information of the surrounding vehicle may include driving information of the surrounding vehicle and state information of the surrounding vehicle (e.g., driving information of the surrounding vehicle, information on the position of the surrounding vehicle, and information on the speed of the surrounding vehicle).

In step 320, the path and velocity plan output unit 220 may output a path and velocity plan corresponding to the input driving state information of the vehicle by using the lane change algorithm. The path and velocity plan output unit 220 may search for a gap into which the vehicle can change its lane, and may control the vehicle to change its lane based on a plurality of lane change transition conditions set to change the lane into the retrieved gap. The path and velocity plan output unit 220 may search for the gap into which the vehicle can change its lane by predicting a future movement of a surrounding vehicle based on the gap search and evaluation algorithm. The path and velocity plan output unit 220 may analyze the easiness of a lane change between the vehicle and the surrounding vehicle and evaluate a level of safety the vehicle and the surrounding vehicle. The path and velocity plan output unit 220 may search for a gap between the vehicle and the surrounding vehicle for the lane change, while simultaneously maintaining a safety distance from a leading vehicle when the vehicle is driving or the driving of the vehicle is stopped, at the ready stage of the vehicle.

The path and velocity plan output unit 220 may transition from the ready stage to the approaching stage in order to adjust the longitudinal position of the vehicle, and may bring the vehicle to approach the retrieved gap in the transitioned approaching stage. The path and velocity plan output unit 220 may determine whether the retrieved gap is a gap reachable by the vehicle for a minimum time or more that is taken to perform the lane change while the vehicle approaches the retrieved gap. If it is determined that the retrieved gap is a gap unreachable by the vehicle for the minimum time or more that is taken to perform the lane change, the path and velocity plan output unit 220 may transition from the approaching stage to the ready stage. In other words, the path and velocity plan output unit 220 may search for a gap again while the vehicle approaches the retrieved gap. When the retrieved gap is determined as a gap reachable by the vehicle while the vehicle approaches the retrieved gap through the re-search, the path and velocity plan output unit 220 may maintain the approach of the vehicle to the retrieved gap for the lane change. When the retrieved gap is determined as a gap unreachable by the vehicle, the path and velocity plan output unit 220 may transition from the approaching stage to the ready stage in order to search for a new gap.

Furthermore, as the vehicle is brought to approach the retrieved gap in the approaching stage, the path and velocity plan output unit 220 may transition from the approaching stage to the negotiation stage so that the vehicle cuts in the retrieved gap. In the transitioned negotiation stage, the vehicle may secure the area of the retrieved gap by delivering a lane change intention of the vehicle to the lagging vehicle in the retrieved gap, and may identify the yield intention of the lagging vehicle. When a minimum safety distance is secured in the retrieved gap, the path and velocity plan output unit 220 may transition from the negotiation stage to the lane change stage. When the minimum safety distance is not secured in the retrieved gap, the path and velocity plan output unit 220 may transition from the negotiation stage to the ready stage.

Furthermore, when identifying the yield intention of the lagging vehicle in the negotiation stage, the path and velocity plan output unit 220 may transition from the negotiation stage to the lane change stage. In the transitioned lane change stage, the vehicle may perform the lane change by using the deep reinforcement learning algorithm. In the lane change stage, the path and velocity plan output unit 220 may calculate a degree of risk for a surrounding vehicle in real time while the vehicle performs the lane change, and may transition from the lane change stage to the ready stage when the calculated degree of risk is a specific degree of risk or more.

Furthermore, when the vehicle performs the lane change in the lane change stage, the path and velocity plan output unit 220 may transition from the lane change stage to the completion stage. When the vehicle succeeds in a target lane for the retrieved gap in the transitioned completion stage, the path and velocity plan output unit 220 may maintain the lane of the vehicle by considering an inter-vehicle distance from the leading vehicle of the target lane.

The lane change technology proposed in an embodiment may be applied to an autonomous driving technology and a driver support system for a vehicle. The autonomous lane change algorithm is a technology that needs to be essentially applied from semi-autonomous driving (level2) to full autonomous driving (level5). The autonomous lane change algorithm may also be applied to a non-essential lane change situation in which a lane change is performed in order to rapidly reach a destination in addition to a situation in which a lane change needs to be essentially performed as in a lane merge section. That is, the autonomous lane change algorithm may be applied to all algorithms for changing a lane through an interaction with a surrounding vehicle, such as a modern roundabout and passing, in addition to a simple lane change.

The aforementioned apparatus may be implemented as a hardware element, a software element and/or a combination of a hardware element and a software element. For example, the apparatus and components described in the embodiments may be implemented using one or more general-purpose computers or special-purpose computers, for example, a processor, a controller, an arithmetic logic unit (ALU), a digital signal processor, a microcomputer, a field program-mable gate array (FPGA), a programmable logic unit (PLU), a microprocessor or any other device capable of executing or responding to an instruction. A processing device may perform an operating system (OS) and one or more software applications executed on the OS. Furthermore, the process-ing device may access, store, manipulate, process and generate data in response to the execution of software. For convenience of understanding, one processing device has been illustrated as being used, but a person having ordinary knowledge in the art may understand that the processing device may include a plurality of processing elements and/or a plurality of types of processing elements. For example, the processing device may include a plurality of processors or one processor and one controller. Furthermore, other pro-cessing configurations, such as a parallel processor, are also possible.

Software may include a computer program, a code, an instruction or a combination of one or more of them, and may configure a processor so that it operates as desired or may instruct processors independently or collectively. Soft-ware and/or data may be embodied in any type of a machine, component, physical device, virtual equipment, or computer storage medium or device so as to be interpreted by the processor or to provide an instruction or data to the proces-sor. The software may be distributed to computer systems connected over a network and may be stored or executed in a distributed manner. The software and data may be stored in one or more computer-readable recording media.

The method according to the embodiment may be imple-mented in the form of a program instruction executable by various computer means and recorded on a computer-read-able recording medium. The computer-readable recording medium may include a program instruction, a data file, and a data structure alone or in combination. The program instructions stored in the medium may be specially designed and constructed for the present disclosure, or may be known and available to those skilled in the field of computer software. Examples of the computer-readable storage medium include magnetic media such as a hard disk, a floppy disk and a magnetic tape, optical media such as a CD-ROM and a DVD, magneto-optical media such as a floptical disk, and hardware devices specially configured to store and execute program instructions such as a ROM, a RAM, and a flash memory. Examples of the program instructions include not only machine language code that is constructed by a compiler but also high-level language code that can be executed by a computer using an interpreter or the like.

As described above, although the embodiments have been described in connection with the limited embodiments and the drawings, those skilled in the art may modify and change the embodiments in various ways from the description. For example, proper results may be achieved although the afore-mentioned descriptions are performed in order different from that of the described method and/or the aforementioned elements, such as the system, configuration, device, and circuit, are coupled or combined in a form different from that of the described method or replaced or substituted with other elements or equivalents.

Accordingly, other implementations, other embodiments, and the equivalents of the claims fall within the scope of the claims.

The invention claimed is:

1. A lane change method performed by a lane change system, comprising:

constructing a finite state machine in which a path and velocity plan among a plurality of path and velocity plans of a vehicle is defined in each state, the finite state machine comprising, as the plurality of path and veloc-ity plans, a ready stage representing a 0th state, an approaching stage representing a 1st state, a negotiation stage representing a 2nd state, a lane change stage representing a 3rd state, and a completion stage repre-senting a 4th state;

receiving driving state information of a vehicle; and outputting, among the plurality of path and velocity plans, a path and velocity plan corresponding to the received driving state information of the vehicle by using a lane change algorithm, wherein the driving state information of the vehicle comprises state information of the vehicle comprising driving information of the vehicle and situation infor-mation for recognizing a situation of a surrounding vehicle of the vehicle, wherein outputting the path and velocity plan comprises:

searching for a gap into which the vehicle changes its lane, the plurality of path and velocity plans being set to change the lane into the searched gap, and controlling the vehicle to change the lane according to the output path and velocity plan, wherein using the finite state machine, the gap is searched in which the path and velocity plan of the vehicle is the ready stage representing the 0th state, and wherein controlling the vehicle comprises, using the finite state machine:

transitioning from the ready stage representing the 0th state to the approaching stage representing the 1st state in response that the gap is searched in the 0th state, wherein, in the approaching stage, a gap search and evaluation algorithm is executed to evaluate easiness and safety of a lane change into the searched gap;

wherein the transitioning from the approaching stage representing the 1st state is selectively performed to one of the ready stage representing the 0th state, the lane change stage representing the 3rd state, and the negotiation stage representing the 2nd state, based on a result of the evaluation of easiness and safety in the approaching stage;

wherein the evaluation of easiness of the lane change comprises a determination that a gap is reachable for a minimum time or more, and the evaluation of safety of the lane change comprises a determination that a gap has a minimum safety distance;

transitioning from the approaching stage representing the 1st state to the ready stage representing the 0th state in case that the searched gap is determined to be a gap unreachable by the vehicle in a minimum time required to perform a lane change while the vehicle approaches the searched gap;

transitioning from the approaching stage representing the 1st state to the lane change stage representing the 3rd state in case that the minimum safety distance is determined to be secured in the searched gap based on the evaluation of safety;

transitioning from the approaching stage representing the 1st state to the negotiation stage representing the 2nd state in case that the minimum safety distance is determined to be not secured in the searched gap based on the evaluation of safety while the vehicle approaches to the searched gap, and transitioning from the negotiation stage to the lane change stage representing the 3rd state in response that the minimum safety distance is secured through confirmation of a yield intention from a lagging vehicle in the searched gap, and transitioning from the negotiation stage to the ready stage representing the 0th state in response that the minimum safety distance is not secured, wherein, in the negotiation stage, the vehicle is controlled to deliver a lane change intention to the lagging vehicle while driving in a position biased laterally toward a lane of the searched gap without crossing into the lane of the searched gap; and calculating a degree of risk with surrounding vehicles in real time while the vehicle performs a lane change in the lane change stage representing the 3rd state, and transitioning from the lane change stage representing the 3rd state to the ready stage representing the 0th state in response that the calculated degree of risk is not less than a specific threshold and transitioning from the lane change stage representing the 3rd state to the completion stage representing the 4th state in response that the calculated degree of risk is below the specific threshold and the vehicle performs the lane change, wherein the finite state machine is configured such that a direct transition from the 3rd state to the 2nd state is not allowed, whereby a direct transition from the lane change stage to the negotiation stage is prevented, and wherein the transitioning from the lane change stage representing the 3rd state to the ready stage representing the 0th state is performed as a risk-avoidance transition when the calculated degree of risk is not less than the specific threshold, thereby bypassing the negotiation stage representing the 2nd state.

2. The lane change method of claim 1, wherein searching for the gap comprises searching for the gap into which the vehicle changes the lane by predicting a future movement of the surrounding vehicle based on the gap search and evaluation algorithm.

3. The lane change method of claim 1, wherein searching for the gap comprises searching for the gap for the lane change between the vehicle and the surrounding vehicle while maintaining a safety distance from a leading vehicle of the vehicle while the vehicle is driving or the driving of the vehicle is stopped in the ready stage.

4. The lane change method of claim 1, wherein controlling the vehicle comprises:

maintaining a lane of the vehicle by considering an inter-vehicle distance from a leading vehicle in a target lane when the vehicle succeeds in the target lane in the retrieved gap in response that the path and velocity plan of the vehicle being transitioned to the fourth phase being the completion stage.

* * * * *